F. L. HITCHCOCK.
TRANSMISSION MECHANISM.
APPLICATION FILED MAY 20, 1914.

1,165,410.

Patented Dec. 28, 1915.
2 SHEETS—SHEET 1.

Witnesses
Chas. N. Leonard.
A. C. Rice.

Inventor
Forrest L. Hitchcock
By Bradford & Doolittle
Attorneys

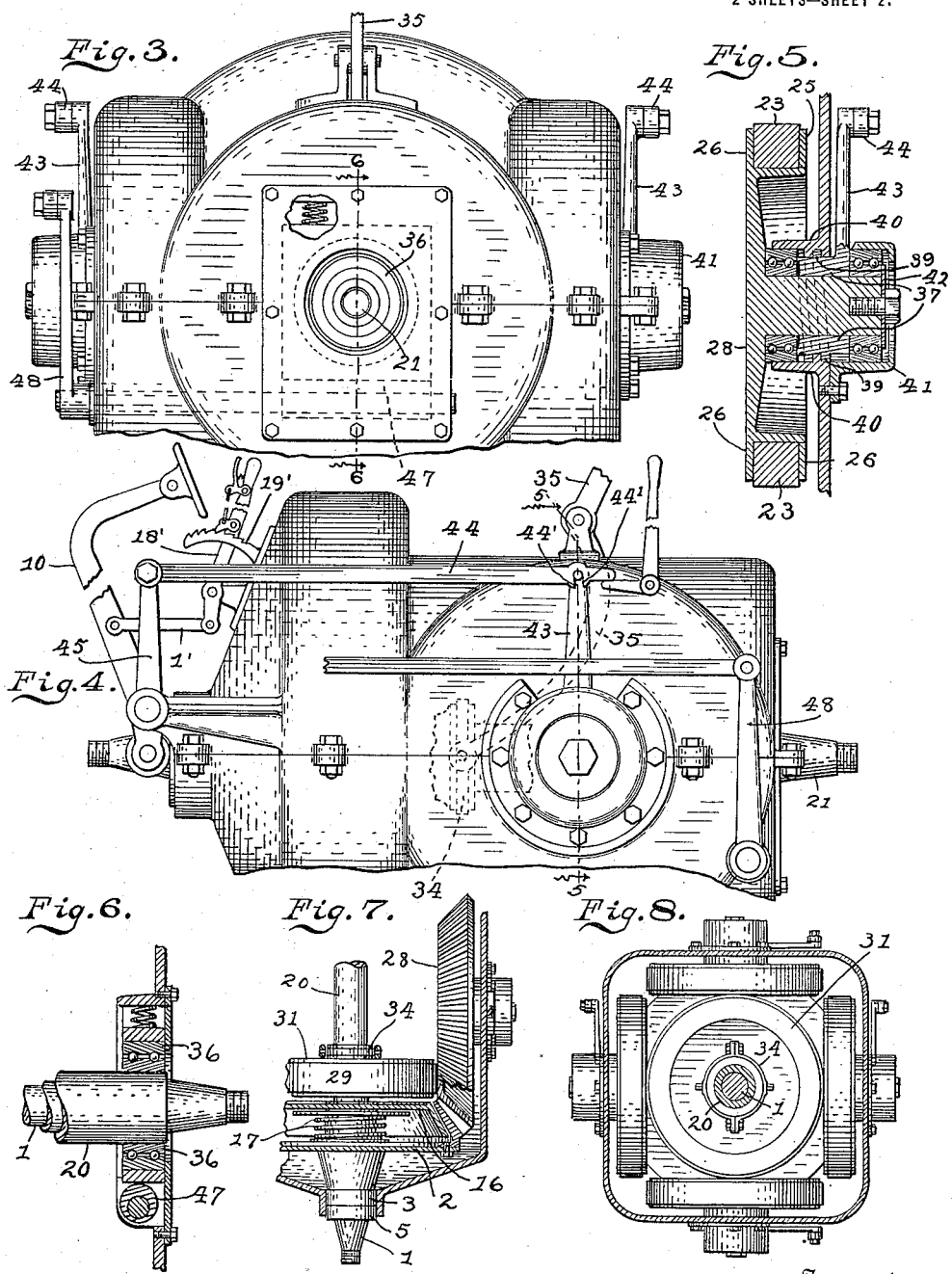

UNITED STATES PATENT OFFICE.

FORREST L. HITCHCOCK, OF INDIANAPOLIS, INDIANA, ASSIGNOR OF ONE-HALF TO EVA R. TEMPLETON.

TRANSMISSION MECHANISM.

1,165,410.  Specification of Letters Patent.  Patented Dec. 28, 1915.

Application filed May 20, 1914. Serial No. 839,777.

*To all whom it may concern:*

Be it known that I, FORREST L. HITCHCOCK, a citizen of the United States, residing at Indianapolis, Marion county, and State of Indiana, have invented and discovered certain new and useful Improvements in Transmission Mechanisms, of which the following is a specification.

My invention relates to transmission mechanisms and its object is to provide means whereby a straight line drive from the power mechanism to the driven mechanism may be obtained, whereby the connection of the driving mechanism with the intermediate speed change mechanism may be dispensed with when the power mechanism is running at normal speeds so that a direct drive may be obtained between the power and the mechanism to be driven and to provide means whereby a friction drive connecting mechanism is provided in which the thrust shall be equal on each side of the main driving shaft and in which the regulation of the speed may be effected by means simple in construction and easily operated.

With these ends in view my invention is embodied in preferable form in the construction hereinafter described and illustrated in the accompanying drawings.

Figure 1:
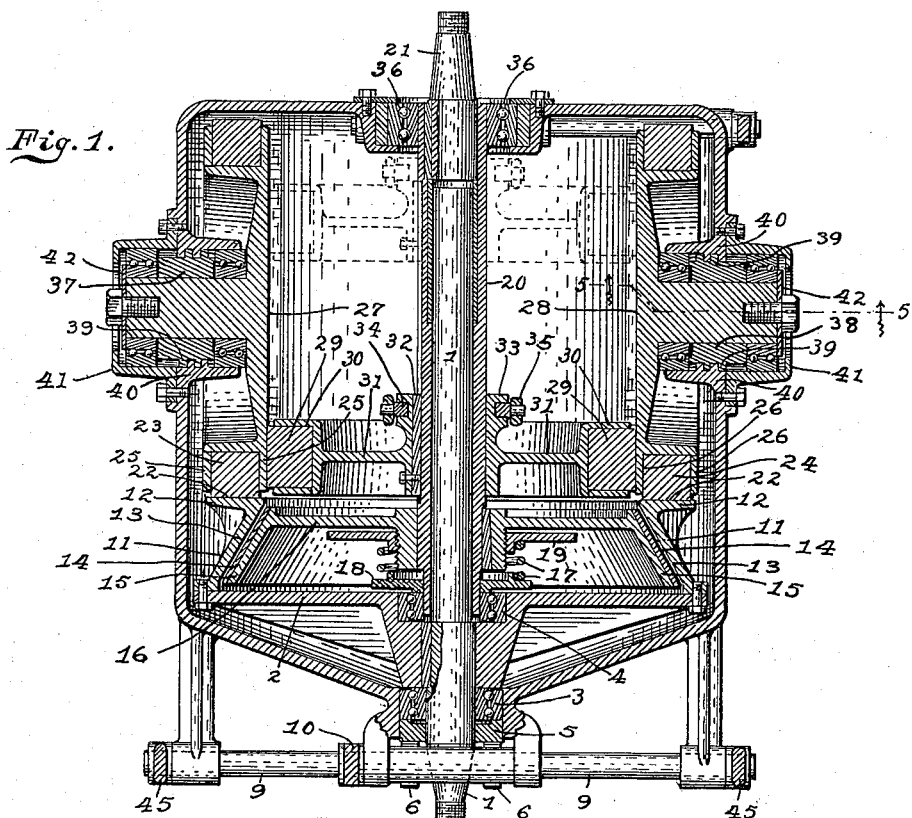
Figure 2:
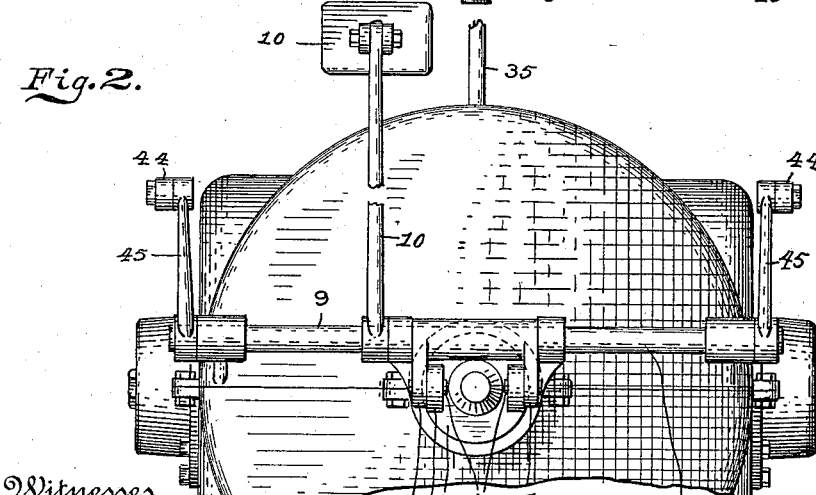

In these drawings Figure 1 is a horizontal longitudinal section of the transmission mechanism; Fig. 2 a front elevation of the driving end of the same; Fig. 3, an elevation of the driven end of said mechanism; Fig. 4, a side elevation partly broken away; Fig. 5, a section on line 5—5 of Figs. 1 and 4; Fig. 6, a detail section on line 6—6 of Fig. 3; Fig. 7, a modification of the connecting means between the main friction disks and the driving mechanism and Fig. 8 a detail rear elevation of a modified form of construction of the friction transmitting mechanism with the rear end of the case removed, and looking forward.

Referring to the drawings, 1 is the main driving shaft and 2 is a fly wheel or other driving member fixed on said shaft. This wheel is mounted between an outer ball bearing sliding collar 3 and a similar inner sliding collar 4. A block or ring 5 is interposed between the outer sliding collar 3 and rollers 6 which are mounted on studs 7 and are operated by means of a bell crank lever 8 which is carried on a shaft 9. The bell crank lever is controlled by a pedal 10 by means of which the wheel 2 may be forced inwardly through pressure applied to the roller and thence against the ring and movable bearings. The wheel 2 is provided with a circumferential flange 11 near its edge which flange is inclined inwardly from the face of the wheel and also has a radial flange 12 at the outer edge of flange 11. The flange 11 has a frictional bearing surface 13, which is adapted to be forced into gripping contact with the inclined frictional bearing surface 14 of a flange 15 formed on a wheel 16. A spring 17 surrounds the hub of the wheel 16 and has a bearing against a sliding plate 18 and also against an adjustable plate 19 which is fixed on the hub of the wheel 16. The action of this spring is to normally force the flange of the wheel 2 against the flange of the wheel 16, thus holding them in frictional driving engagement. The wheel 2, wheel 16 and the spring 17, therefore, constitute a clutch device, the normal clutching action of which is adapted to be released by pressure applied to the pedal. The wheel 16 is fixed upon a hollow shaft or tube 20 into which the main driving shaft 1 extends. This tube constitutes the transmission shaft of the mechanism and is connected to the driven shaft section 21. In order to hold the clutch out of engagement, that is in neutral position, so that the power mechanism may be disconnected from the driven means, the pedal bar is connected, as is usual, with link 17', Fig. 4, pivoted to a lever 18', which has a detent adapted to mesh with the teeth of a sector 19'.

The flange 12 of the wheel 2 is provided with a circumferential driving face 22, which in the form shown in Fig. 1 is a mere friction face and is adapted to exert a frictional drive contact against the friction rings 23 and 24 which are fixed in rims 25 and 26 respectively of opposite friction disks 27 and 28. These disks are mounted on opposite sides of the shaft 1 and are movable radially with respect to the axis of said shaft by suitable adjusting means. They are adapted to be moved into and out of engagement with a friction ring 29 mounted in the rim 30 of a speed controlling and reversing wheel 31 which is slidably mounted on the shaft 20 by means of a key 32 whereby the controlling wheel may be moved along the shaft but is adapted to be rotated therewith. The hub of this wheel is provided with an extension 33 in which is fitted a half ring 34 adapted to be engaged by the lower end of a lever 35 which is suitably pivoted on the supporting frame of the device to which the mechanism is to be applied and has a handle extending within convenient reach of the operator so that the controlling wheel may be shifted along the shaft. When such wheel is engaged with the disks 27 and 28 above the axes of these disks, viewed in Fig. 1, then the driven mechanism is driven rearwardly or in reverse direction, while when the controlling member is shifted to the other side of the centers of the friction disks the mechanism is driven in the opposite direction or forwardly. The speed of the disk 31 will, of course, depend upon the relative distance of the same from the centers of the disks 27 and 28. The rear end of the hollow shaft 20 is mounted in suitable bearings 36 fixed in the wall of the casing.

Whenever the member 2 of the clutch mechanism is shifted by the pedal to release the same from engagement with the member 16, the friction disks 27 and 28 must likewise be moved axially to engage them with the main controlling member 31. To this end sleeves 37 and 38 are provided for the shafts of the disks 27 and 28 respectively and these sleeves have threads 39 which are adapted to engage corresponding threads formed in the flange 40 of the casing. A cap 41 surrounds the bearings on the outside of the shaft of the disk and a washer 42 is secured on the end of such shaft. Extending upwardly from each of the sleeves is an integral arm 43, to which is pivoted a link 44, the outer end of which is pivoted to a lever 45 carried by the shaft 9, which is operated by the pedal 10, whereby upon operation of the clutch mechanism through the pedal or spring 17, the shafts of the two friction disks 27 and 28 will be turned and caused to travel radially toward or away from shaft 20, owing to the engagement of the screw threads 39 and the corresponding threads in the casing 40.

Although the controlling member 31 is adapted to be shifted to and from the centers of the transmitting disks 27 and 28 by means of the lever 35 as heretofore described, yet this shifting action of the controlling wheel for the purpose of controlling the speed of the driven mechanism may be effected by raising or lowering the rear end of the shaft 20, and the shafts 1 and 21 contained therein. To this end the bearing 36 at the driven end of the mechanism in which the tube is mounted is slidably carried in the casing and a cam 47 underneath this sliding bearing is adapted to lift the same when actuated by a lever 48 connected thereto. Upon lifting the shaft and tube the controlling wheel 31 will be lifted above the centers of the transmitting disks 27 and 28, and the off-center engagement of the wheel 31 with one of the disks at this point will cause said wheel to gradually travel along the shaft 20, thus gradually increasing the speed of the mechanism. Since the disks 27 and 28 travel in opposite directions, it is necessary when the controlling wheel is shifted by the means just described that only one disk be engaged therewith. To this end, one of the arms 44 (connected to one of the arms 43) is provided with a notch or recess 44' which is adapted to releasably engage the pin at the upper end of the lever 43, and by means of which open notch said arm 44 may be disengaged from the lever and one of the disks 27, 28 engaged with the wheel 31, while the other disk is held out of contact therewith.

In Fig. 7, a modification of part of the connecting mechanism is shown in which gear teeth are provided between the main driving member, such as 2 and the transmitting friction disks such as 27 and 28, instead of employing friction surfaces between these members.

In Fig. 8, an arrangement is illustrated in which four transmitting friction disks are employed instead of the two shown in Fig. 1.

The operation of the device is as follows:—Although the transmission mechanism above shown and described is capable of application to various power driven mechanisms, in which it is desired to clearly and easily change the speed of the connecting parts, yet the invention is of particular usefulness in connection with motor vehicles and in the drawings some of the controlling parts illustrated are those customarily employed in automobiles for the purpose of regulating the speed, such as the pedal and the lever for moving the controlling wheel. When the device is applied to an automobile, the driving shaft 1 forms part of or is a continuation of the main shaft of the engine and extends from front to rear of the automobile behind the engine. In such an arrangement the ordinary fly wheel may be employed and the transmission mechanism located to the rear of such fly wheel. Or if desired, the wheel 2 of my mechanism may be made heavy enough to constitute a fly wheel and inclosed within the outer case shown and described. When it is desired to disconnect the axle of the vehicle or other part to be driven from the engine, the pedal is moved to neutral position and held therein by the engagement of the detent of lever 18' engaging with the sector 19', so that the wheel 2 will be held out of engagement with the wheel 16 and also said wheel 2 will be held out of engagement with the friction rings 23 and 24 of the friction driving disks 27 and 28 and hence the driving mechanism will be out of connection with the power mechanism. When starting the operation of the part to be driven, such as by connecting the engine with the rear driving axle of an automobile, it is desirable to start on low speeds and to this end in my invention it is necessary to bring the intermediate friction mechanism into engagement. This is effected by pressing down the pedal 10 which action will turn the shaft 9 and operate the bell crank lever 8 and thus press the rollers 6 against the sliding block 5 which transmits the thrust of the rollers through the ball bearings 3 and against the hub of the wheel 2, which wheel is keyed to the driving shaft 1. This pressure will force the wheel 2 inwardly with the shaft 1, separating the flange 11 and 15, so as to release the clutching action between the said member 2 and the wheel 16. At the same time the face of the flange 12 of the wheel 2 will be carried into frictional engagement with the rings 23 and 24 of the two disks 27 and 28, by which engagement said latter disks are adapted to be driven on their respective shafts by the rotation of the wheel 2 which is fixed to the driving shaft. At the same time that the driving member 2 is forced into engagement with the disks, said disks will be carried toward the axis of the driving shaft and pressed into driving engagement with the ring 29 of the speed-controlling wheel 31. This action is effected by the movement of the levers 45 which are connected to the shaft 9 (operated by the pedal 10) and the upper ends of which levers are connected to links 44 and which links serve to turn the arms 43 through arcs of circles, thus rotating the sleeves 37 and 38, which surround the shafts of the disks 27 and 28. The rotation of these threaded sleeves in the fixed parts 40 of the casing causes the sleeves to travel relatively to said casing and thus force the disks inwardly toward the driving shaft, through pressure applied through the ball bearings surrounding the shafts of the disks. When starting, the speed controlling wheel is preferably closely adjacent the centers of the disks 27 and 28 so that the controlling wheel will be driven at a relatively low speed initially. If the wheel 31 is in front of the centers of the disks 27 and 28 as viewed in Fig. 1, then the mechanism will be started in a forward direction, but if upon the other side of the centers of the disks as shown by dotted lines then the mechanism will be driven reversely. The wheel 31 being keyed to the hollow shaft 20, which in turn is fixed to the driven shaft 21, will serve to drive the shaft 21 at a speed determined by the distance of said wheel from the centers of the friction driving disks 27 and 28.

To increase the speed of the mechanism the controlling wheel 31 is either moved longitudinally along the shaft 20, that is, in an axial direction with respect to said shaft and this movement may be produced either by the positive shifting of the wheel through the lever 35 or the automatic shifting of the wheel effected by raising the driven shaft so as to carry the center of the controlling wheel to an angular position with respect to the centers of the driving disks 27 and 28. When operated by the former method, it is necessary to first disconnect the driving disks 27 and 28 from frictional engagement with the controlling wheel which is effected by releasing the pedal and thereupon the spring 17 will force the wheel 2 away from engagement with the friction rings 23 and 24 of the driving disks 27 and 28 and carry said wheel 2 into engagement with the clutch wheel 16 and at the same time the levers 45 and links 44 will be operated to turn the threaded sleeves 37 and 38 and move the disks 27 and 28 outwardly away from the controlling wheel. Thereupon the controlling wheel may be shifted toward the front or rear by the lever 35 and after the wheel has been thus shifted, the connection through the friction transmission mechanism may be reëstablished by merely pressing on the pedal.

To automatically effect the longitudinal travel of the speed controlling wheel 31 along its shaft, one of the links 44 is released from engagement with the pin at the outer end of the lever 43 corresponding to one of the disks, after such disk has been removed from engagement with the controlling wheel. Thereupon the shaft 20 is lifted by rocking the cam 47 against the bearing in which the said shaft is supported. This movement carries the shaft 20 off center with respect to the disks 27 and 28, one of which is still held in engagement with the controlling wheel, whereupon the engaged disk, owing to the direction of its travel and the fact that its tendency is to constantly push the wheel 31 forwardly during the initial part of its circle of rotation, will cause said wheel 31 to travel longitudinally on the shaft 20, thus gradually increasing the speed of the wheel and the shaft driven thereby. The normal speed of the engine is preferably high speed and in my invention the driven and driving mechanism when operated at this speed, are adapted to be directly connected without the operative interposition of the friction transmission mechanism. This direct connection is effected merely by releasing the pedal, the spring 17 serving to throw the two clutch members 2 and 16 into engagement, whereby the hollow driven shaft 20 is directly driven from the driving shaft 1, by this engagement of the respective clutch members of the two shafts. This result is rendered possible by having the axis of the driving and driven shafts extending in the same direction with one shaft preferably concentric to the other and by having means which will automatically disconnect the friction transmission mechanism whenever the two clutch members are positively connected and which will also release said clutch members whenever the friction transmission mechanism is forced positively into engagement. When the driving and driven mechanisms are thus directly connected, it is possible in my invention to shift the speed controlling wheel for the purpose of altering the speed of the driven mechanism. In the ordinary friction driven transmissions, this action is not possible and it is required that the mechanisms be first disconnected before the speed controlling means can be adjusted. In the present case this result is accomplished primarily owing to the extension of the axes of the driving and driven shafts in the same direction and to the axial movement of the controlling wheel with respect to said shafts.

In the construction above described it will be seen that although a friction mechanism is employed to vary the speed of the driven part, yet that at normal speeds, such connection is dispensed with and a direct connection in a straight line between the power and the driven part provided, thus avoiding transverse strains, avoiding the necessity of providing an extra shaft at right angles to the main shaft and also avoiding loss of power and obviating wear on the friction disks occasioned by the constant use of such disks in the ordinary friction drive mechanism. If desired, the gear connection shown in Fig. 7 may be substituted for the frictional connection illustrated in Fig. 1, between the wheel 2 and the disks 27 and 28.

In Fig. 8 the modification there illustrated provides a construction which enables still greater driving power on the controlling wheel to be obtained than is possible with a two-disk arrangement. With a plurality of disks operating diametrically with respect to the connecting and controlling wheel, it is evident that the power applied to the wheel is balanced and transverse thrust and loss of power avoided and such conditions obtain both with the construction illustrated in Fig. 1 and that shown in Fig. 8.

Having thus described my invention, what I claim is:—

1. A transmission mechanism having a driving shaft, a driven shaft extending in the same direction as the driving shaft, clutch means for driving said driven shaft by the first shaft at the same speed as the latter, a frictional speed controlling wheel mounted on the driven shaft and movable axially thereof, a friction driving disk, means to move said driving disk into engagement with said controlling wheel, separate means independent of one another for shifting said clutch and said controlling wheel respectively and means carried by and concentric with the driving shaft and movable longitudinally of the axis thereof for directly engaging said friction disk to drive the same from the said shaft.

2. A transmission mechanism having a driving shaft, a driven shaft, said shafts having their axes in alinement, clutch means between said shafts, said means including a driving member which is movable axially of the driving shaft, opposed friction driving disks on opposite sides of said shafts and having their axes at right angles thereto, means of operative connection between said driving clutch member and said driving disks, a frictional speed controlling wheel mounted on said driven shaft, means to move said wheel axially of said shaft, and means to move said driving disks into engagement with said wheel, said controlling wheel being movable past the centers of said driving disks, substantially as described.

3. A transmission mechanism having a driving shaft, a driven shaft, means of releasable and direct connection between the driving and driven shafts, a friction drive mechanism intermediate the shafts and means to automatically connect said friction mechanism with the shafts by the release of the direct drive connection and means to automatically release said friction drive connection by connecting the direct drive means with the shafts, substantially as described.

4. A transmission mechanism having a main driving shaft, a driven shaft, a friction driving disk, means mounted on and concentric with the driving shaft for direct peripheral engagement with said friction driving disk and a friction driven speed controlling wheel connected to the driven shaft and mounted axially of the said main driving shaft and movable longitudinally thereof, and means for moving said driving disk into engagement with said wheel for driving the latter.

5. In a friction transmission mechanism in combination with a speed controlling wheel, a driving shaft, a separate and independent driven shaft on which said wheel is mounted, said shafts having their axes extending in the same direction, a plurality of opposed friction wheel driving disks adapted to engage said wheel and having their axes at right angles to the axis of the wheel shaft, substantially as described.

6. In a friction transmission mechanism, in combination with a driving shaft, a driven shaft in alinement with said driving shaft, a clutch member mounted on said driven shaft, a movable clutch member mounted on said driving shaft, friction driving disks having their axes at right angles to said shafts, means of operative engagement between said driving shaft clutch member and said friction driving disks, a frictional speed controlling wheel mounted on said driven shaft and movable axially thereof and having means to engage said driving disks, means for moving said disks toward and away from said wheel, means for moving said clutch member into and out of engagement with said disks and a common operating member for said controlling means of the disk and clutch member and means to move the clutch members into engagement and the disks out of engagement with the controlling wheel by the same operation of said member, substantially as described.

7. A transmission mechanism having a driving shaft, a driven shaft, clutch members mounted on the respective shafts, a friction wheel mounted on the driven shaft and movable axially thereof, a friction disk adapted to drive said wheel, said driving shaft clutch member being provided with means to directly engage said friction disk to drive the same.

8. A transmission mechanism having a driving shaft, a driven shaft, an axially movable friction wheel on the driven shaft, a driving disk adapted to engage said wheel, a clutch member on said driven shaft, a clutch member on said driving shaft and enveloping the driven clutch member, and having means on its inner face to engage said latter member, and means on its outer peripheral face to engage said friction disk.

In witness whereof, I have hereunto set my hand and seal at Indianapolis, Indiana, this 16th day of May, A. D. nineteen hundred and fourteen.

FORREST L. HITCHCOCK. [L. s.]

Witnesses:
S. L. ATKINSON,
W. M. EARSOM.

Copies of this patent may be obtained for five cents each, by addressing the "Commissioner of Patents, Washington, D. C."